(12) United States Patent
Ryoo et al.

(10) Patent No.: US 7,196,122 B2
(45) Date of Patent: *Mar. 27, 2007

(54) NANOPOROUS ORGANIC POLYMER COMPOSITE AND PREPARATION METHOD THEREOF AND ITS APPLICATION FOR CATALYST

(75) Inventors: Ryong Ryoo, Daejeon (KR); Minkee Choi, Chuncheon-Si (KR); Shin Hei Choi, Anyang-Si (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 192 days.

This patent is subject to a terminal disclaimer.

(21) Appl. No.: 10/869,013

(22) Filed: Jun. 15, 2004

(65) Prior Publication Data
US 2005/0049353 A1   Mar. 3, 2005

(30) Foreign Application Priority Data

Aug. 27, 2003  (KR) .................... 10-2003-0059646
May 4, 2004   (KR) .................... 10-2004-0031437

(51) Int. Cl.
   *C08K 3/34*   (2006.01)
(52) U.S. Cl. .................... 523/218; 524/450
(58) Field of Classification Search ........... 523/218; 524/450
   See application file for complete search history.

(56) References Cited

U.S. PATENT DOCUMENTS 6,585,948 B1 * 7/2003 Ryoo et al. ............. 423/445 R
6,702,965 B2   3/2004 Penneau et al.
6,737,145 B1   5/2004 Watanabe et al.

FOREIGN PATENT DOCUMENTS

KR   10-1998-0047833   6/2000

OTHER PUBLICATIONS

Choi and Ryoo, Ordered Nanoporous polymer-carbon composites, Nature Materials, 2003; 2:473-476.
Goltner and Weibenberger, Mesoporous organic polymers obtained by "twostep nanocasting", Acta Polym., 1998; 49:704-709.
Reppy et al., A new Family of Polymerizable Lyotropic Liquid Crystals: Control of Feature Size in Cross-Linked Inverted Hexagonal Assemblies via Monomer Structure, J. Am. Chem. Soc., 2001; 123(3):363-371.
Zalusky et al., Mesoporous Polystyrene Monoliths, J. Am. Chem. Soc., 2001; 123:1519-1520.

* cited by examiner

*Primary Examiner*—Edward J. Cain
(74) *Attorney, Agent, or Firm*—JHK Law; Joseph Hyosuk Kim

(57) ABSTRACT

Provided are a nanoporous organic polymer and preparation method thereof, and its application for catalyst. More particularly, provided is a nanoporous organic polymer composite comprising a mesoporous molecular sieve having micropores within mesopore walls, and an organic polymer impregnated within the micropores of the molecular sieve and coated on the wall surfaces of the molecular sieve. Also, provided is a method for preparing a nanoporous organic polymer composite comprising preparing a mesoporous molecular sieve having micropores within mesopore walls; impregnating an organic monomer diluted in solvent into the molecular sieve; and polymerizing the molecular sieve impregnated with the organic monomers to form organic polymers within the micropores and on the wall surfaces of the mesoporous molecular sieves. Further, provided are properties of catalytic reaction of the material as applicable representative examples of the nanoporous organic polymer.

12 Claims, 7 Drawing Sheets

[FIG. 1]
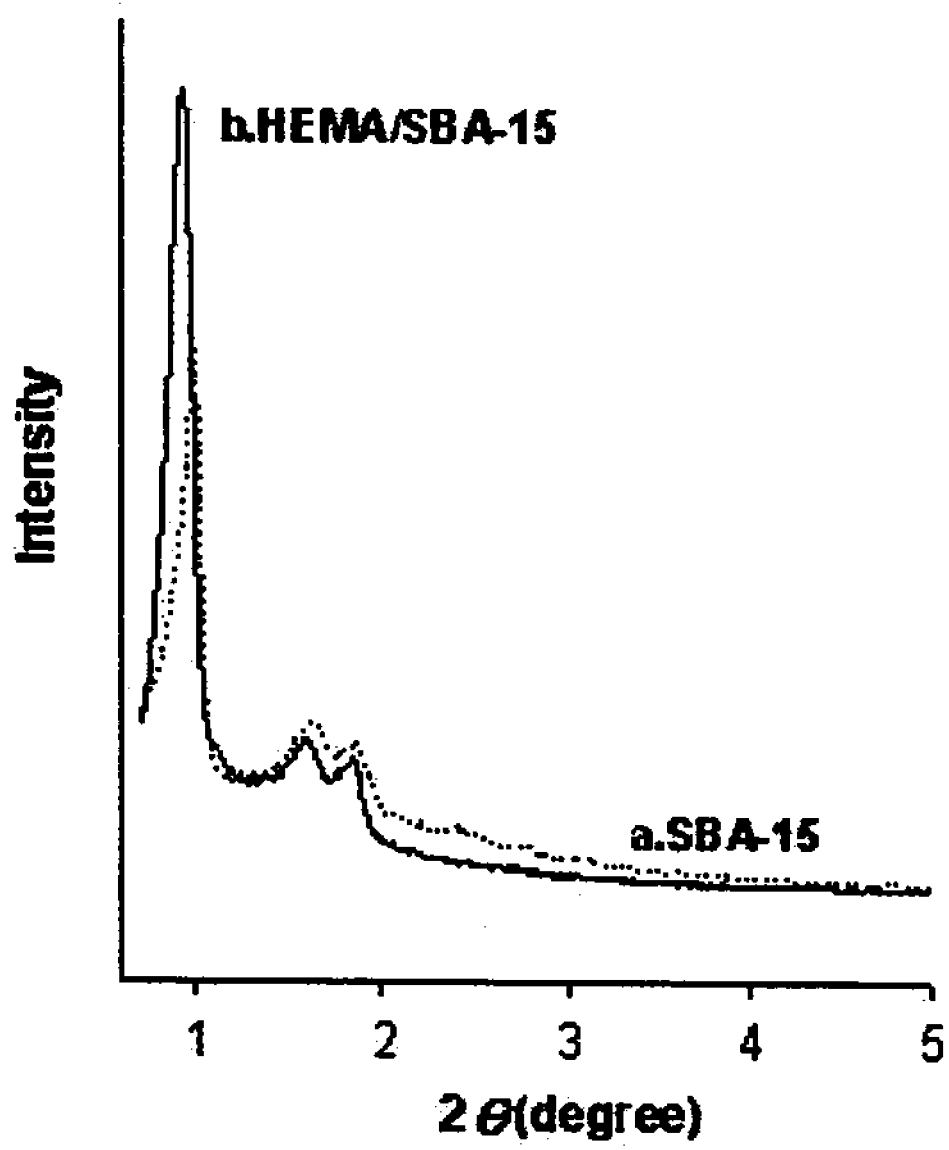

[FIG. 2]
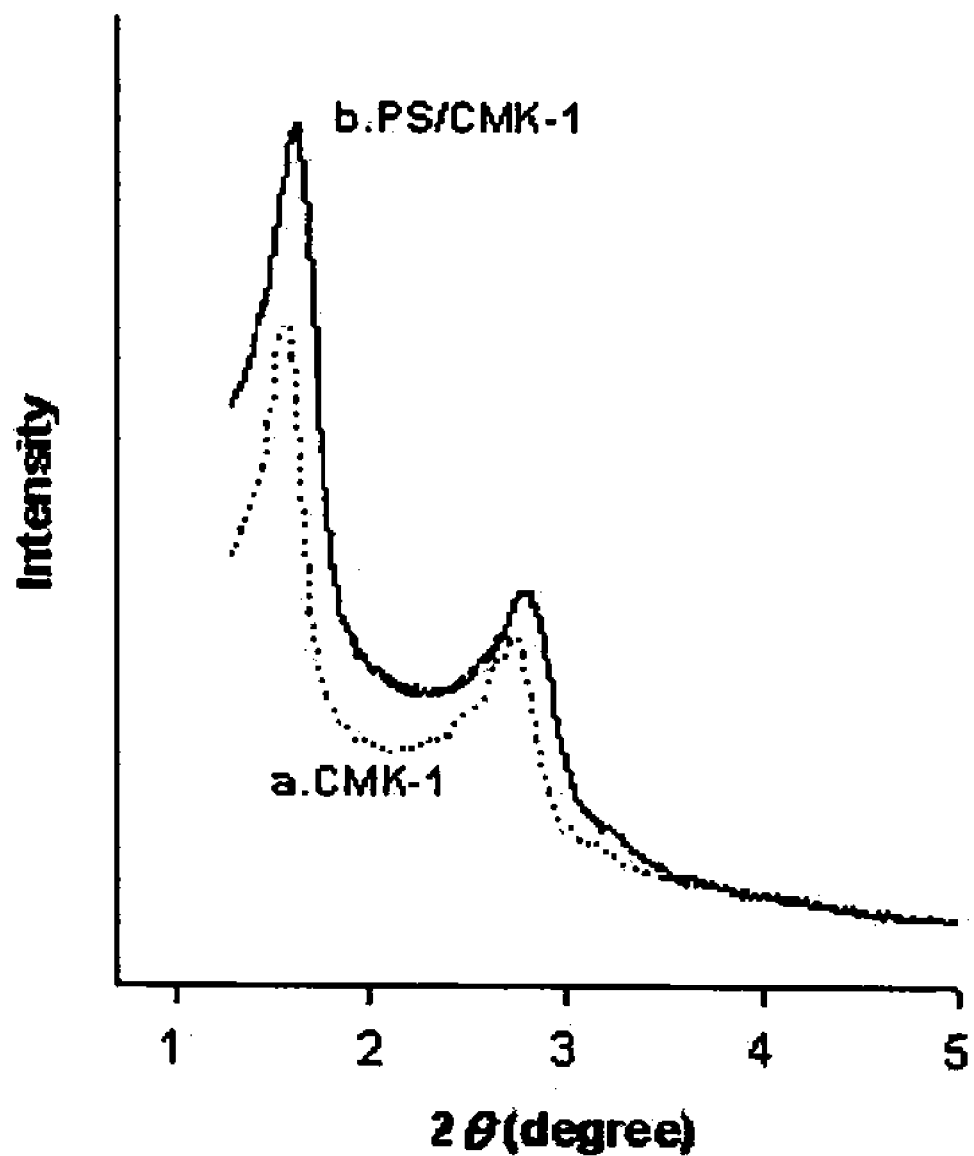

[FIG. 3]
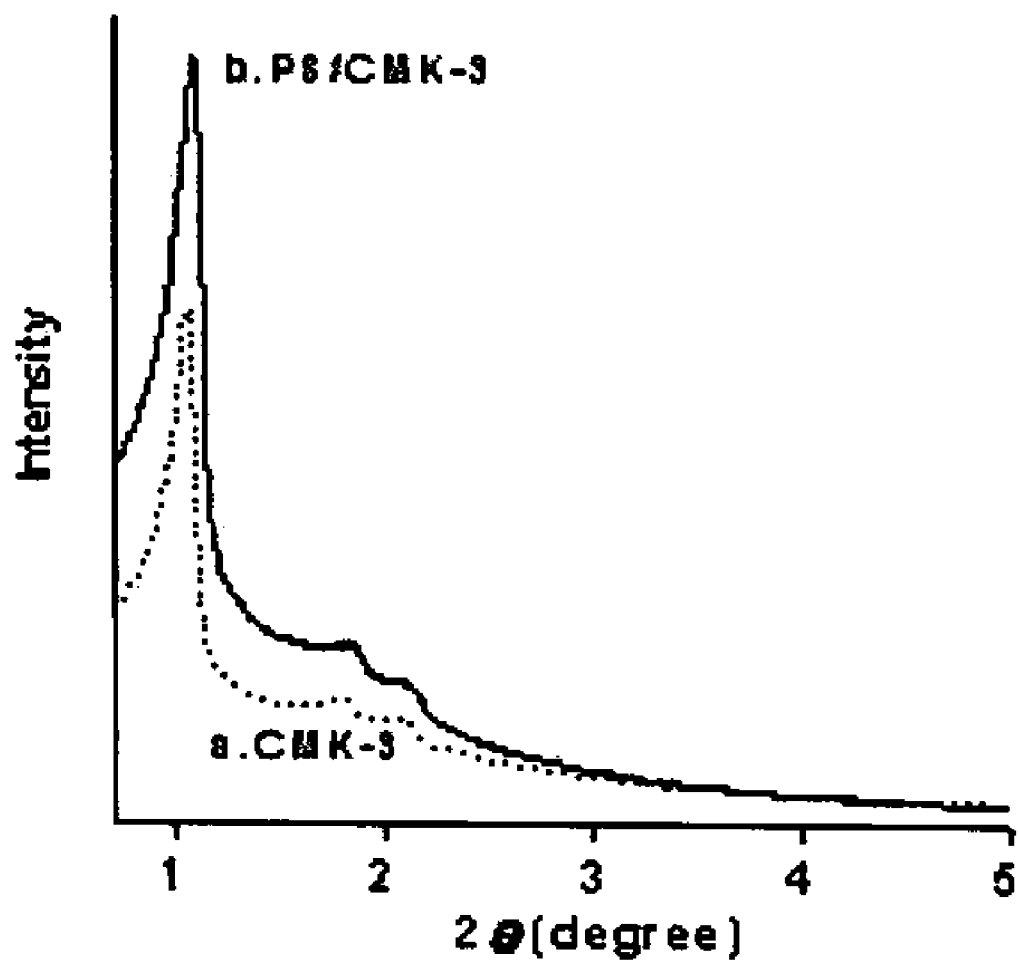

[FIG. 4]
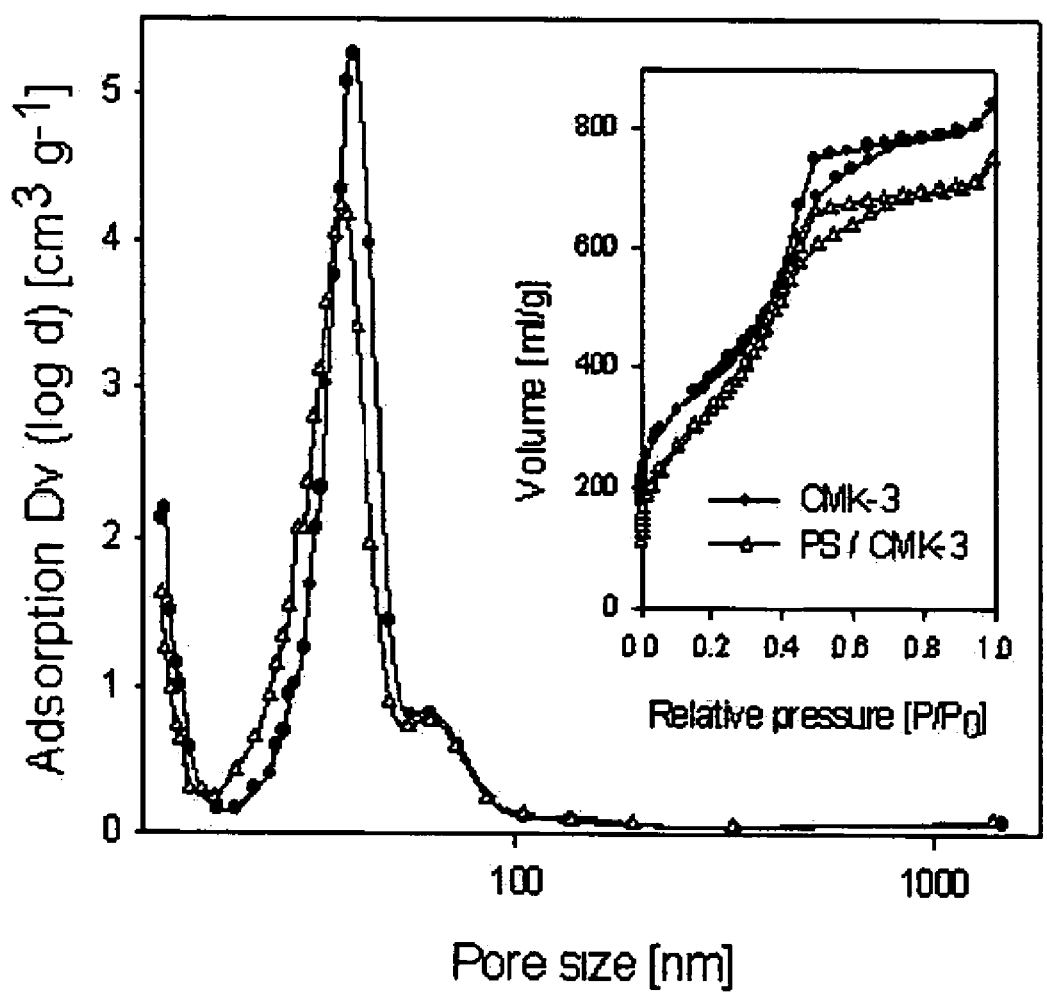

[FIG. 5]
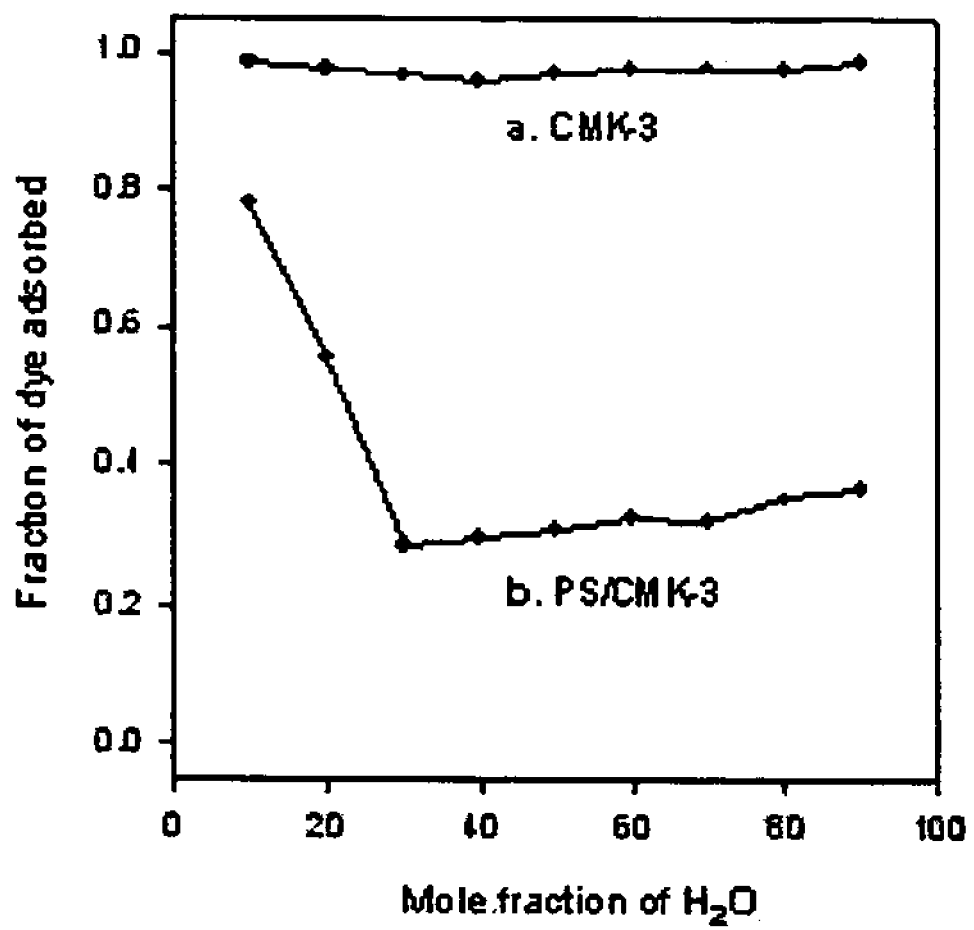

[FIG. 6]
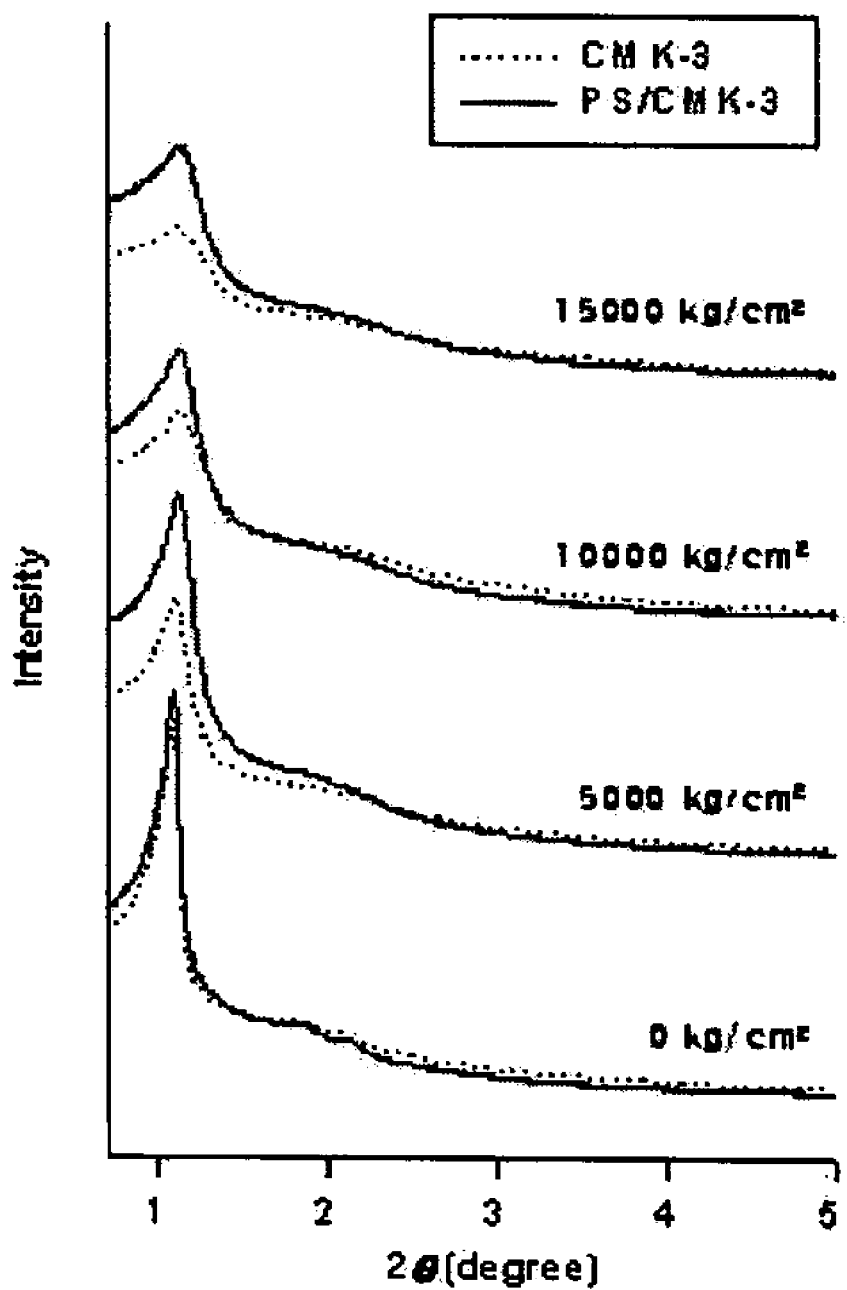

[FIG. 7]
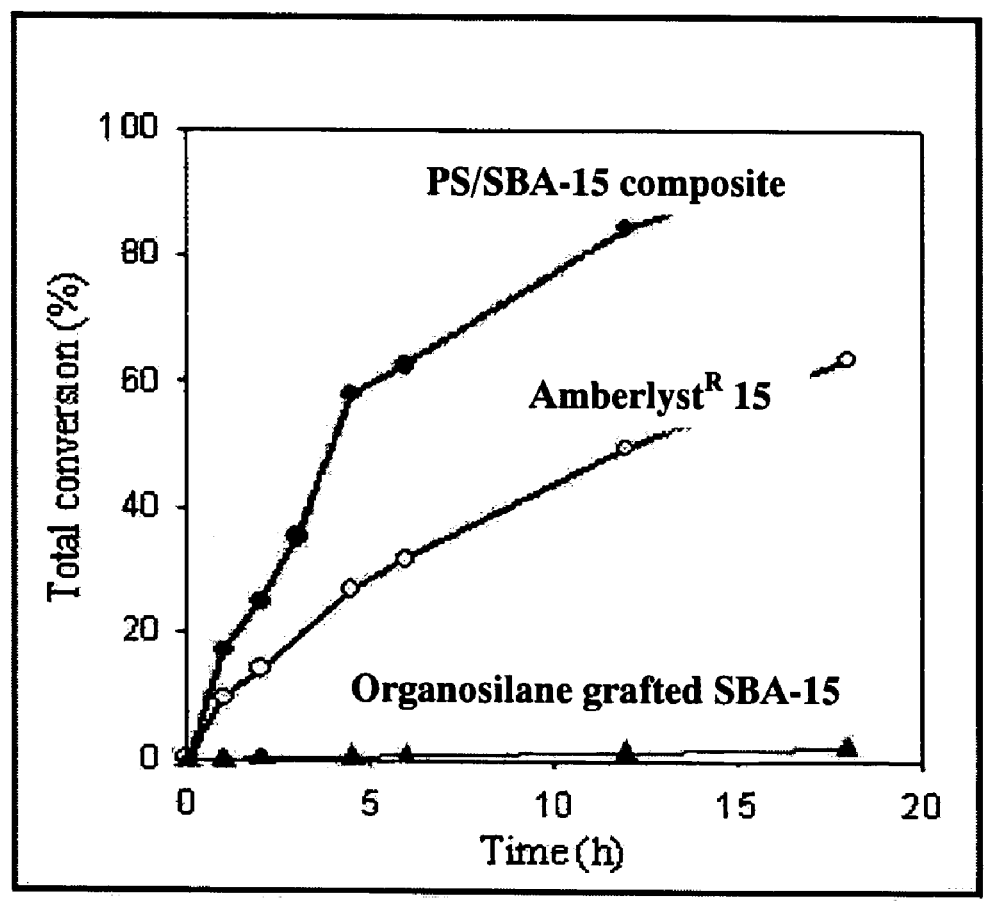

NANOPOROUS ORGANIC POLYMER COMPOSITE AND PREPARATION METHOD THEREOF AND ITS APPLICATION FOR CATALYST

CROSS-REFERENCE TO RELATED APPLICATION

This application claims the benefit of Korean Patent Application No. 10-2003-59646 filed Aug. 27, 2003 and 10-2004-31437 filed May 4, 2004, the disclosure of which is hereby incorporated herein by reference in its entirety.

BACKGROUND

1. Technical Field

The present invention relates to a nanoporous organic polymer and preparation method thereof, and its application for catalyst, and more particularly, to an ordered nanoporous organic polymer having excellent mechanical strength, thermal stability and chemical resistance, and exhibiting improved catalytic activities, compared to the porous catalyst materials prepared by prior art.

2. Discussion of the Related Art

Nanostructured organic materials with uniform nanopores have been sought for a long time in materials science. There have been many successful reports on the synthesis of nanostructured organic materials using supramolecular liquid crystal templating route. Ordered nanoporous polymeric materials can also be synthesized through a polymerization route using inorganic colloidal or mesoporous silica templates.

However, the nanoporous materials composed of pure organic material frameworks made by prior art have low mechanical strength, thermal stability, and chemical stability against organic solvents, compared to nanoporous inorganic, silica and carbon materials. Moreover, the synthesis of the organic materials is yet of limited success in the variation of pore sizes and structures, whereas a rich variety of hexagonal and cubic structures is available with tunable pore diameters in the case of the inorganic materials.

Nanoporous organic polymers have been used as adsorbents, separation media and catalyst supports. However, above-mentioned problems in nanoporous organic materials produced by prior art limited their wide applications. In this regard, it is highly desirable to synthesize nanoporous organic polymers, which exhibit enhanced structural stability for their promising applications.

SUMMARY OF THE INVENTION

Therefore, the present invention is directed to provide a nanoporous organic polymer having enhanced structural order, improved mechanical strength, thermal stability and chemical resistance.

The other object of the present invention is to describe a synthesis strategy towards ordered nanoporous organic polymers, using mesoporous silica or carbon as a retaining support.

Still another object of the present invention is to provide a nanoporous organic polymer composite exhibiting excellent catalytic activities compared to those of the porous catalytic materials prepared by prior art.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIG. 1 is the X-ray diffraction patterns of the mesoporous silica molecular sieve (SBA-15) and the nanoporous polymer/silica composite (PHEMA/SBA-15) according to the present invention;

FIG. 2 is the X-ray diffraction patterns of the mesoporous carbon molecular sieve CMK-1 and the nanoporous polymer/carbon composite (PS/CMK-1);

FIG. 3 is the X-ray diffraction patterns of the mesoporous carbon molecular sieve CMK-3 and the nanoporous polymer/carbon composite (PS/CMK-3);

FIG. 4 is a pore size distribution for mesoporous carbon, CMK-3 and its composite material (PS/CMK-3), which was determined by Barrett-Joyner-Halenda (BJH) analysis of the nitrogen adsorption isotherm (inset).

FIG. 5 is the elution of direct blue 15 after adsorption on CMK-3 and sulfonated PS/CMK-3 nanoporous polymer/carbon composite depicting as elution concentration versus water/ethanol composition ratio;

FIG. 6 is a graph showing the comparison data of the stability against mechanical strength obtained from the intensity of X-ray diffraction and shape of carbon molecular sieve CMK-3 and its composite, PS/CMK-3 according to the present invention; and FIG. 7 is a graph showing the comparison data of the catalytic properties appeared from the esterification reaction of the nanoporous polymer composite according to the present invention, a material synthesized by a prior art, and the commercial catalyst.

DETAILED DESCRIPTION OF THE INVENTION

Therefore, the present invention is directed to provide a nanoporous polymer composite comprising a mesoporous molecular sieve having micropores within mesopore wall, and an organic polymer impregnated within the micropores and coated on the surfaces of the wall of the mesoporous molecular sieve.

The present invention will now be described more fully hereinafter with reference to the accompanying drawings, in which preferred embodiments of the invention are shown. This invention may, however, be embodied in different forms and should not be construed as limited to the embodiments set forth herein.

The mesoporous molecular sieve herein refers to, but not particularly limited, an ordered molecular sieve having meso-sized pore distribution ranging 2~50 nm. The mesoporous molecular sieve can be a mesoporous silica molecular sieve or a mesoporous carbon molecular sieve.

Various types of the mesoporous silica materials are already known. For example, materials having hexagonal structures in pore arrangements such as MCM-41, SBA-15, MSU-H, etc., and materials having cubic structures in pore arrangements such as MCM-48, SBA-1, SBA-16, etc. are known in the art. Mesoporous silica molecular sieves will be described in embodiments of the present invention below. The mesoporous silica molecular sieves can be impregnated with organic polymers by introducing fresh synthesis condition capable of controlling distribution of micropores present in mesopore walls.

The carbon molecular sieve as another example of mesoporous molecular sieves is a material having many micropores (less than 2 nm) within mesopore walls. The material is known as CMK-n (carbon mesostructured by KAIST, and n refers to a serial number) first synthesized by Ryong Ryoo professor and colleagues of Korea Advanced Institute of Science and Technology, Daejeon, Korea (see Korean Patent No. 0307692; *Nature* 2001, 412, 169).

According to previous researches concerning carbon molecular sieves, the carbon molecular sieves have advantages of high thermal stability, hydrothermal stability, chemical resistance and organophilicity, etc. compared to other metal oxides-based molecular sieve materials. However, the carbon molecular sieves previously disclosed have small pores, although have uniform pore size distribution, and have wide range of pore size distribution, thereby restricting their application and depleting overall structural order.

The materials belonging to the above cited CMK-n are obtained by aligning carbon nanolines or carbon nanotubes having uniform sizes within pores with use of mesoporous silica molecular sieves as templates, and then removing the silica molecular sieves. The materials have uniform properties of various pore arrangements of hexagonal or cubic structures as well as about 2~10 nm of pore diameters.

The more micropores that can impregnate organic monomers within the pore walls the mesoporous molecular sieves have, the more organic polymers the molecular sieves can contain. Accordingly, the distribution degree of micropores is particularly not limited as long as the molecular sieves can contain organic polymers to be introduced into the sieves. Further, the nanoporous organic polymer materials according to the present invention are formed on the wall surfaces of mesoporous molecular sieves as films in desired thickness within the ranges that the organic polymers do not decrease significantly the mesopore sizes. Such structures provide nanoporous organic polymers having superior mechanical strength, thermal stability and chemical resistance by forming composite frameworks between the organic polymers and silica or carbon frameworks.

Further, desired functional groups can be introduced into the nanopore walls of the nanoporous organic polymers according to the present invention. Hydrophilicity or lipophilicity can be imparted to the nanoporous organic polymers by introducing functional groups into surfaces of the materials to deform the nanopore walls. Such functional groups can be selected from a sulfonyl group, a carboxyl group, a nitro group, an amine group, a phosphone group, etc., when desired, but are not particularly limited to these.

The nanoporous organic polymers according to the present invention can be prepared by impregnating organic monomers into mesoporous molecular sieves having micropores within mesopore walls, and polymerizing the organic monomers to form organic polymers within the micropores and on the wall surfaces of the mesoporous molecular sieves.

The organic monomers are impregnated into the mesoporous structures, filled in the micropores formed within the walls, and absorbed in the pore walls by capillary condensation phenomenon. Such filled and absorbed organic monomers are polymerized to form organic polymers, thereby forming films on mesopore walls.

The organic monomers that can be used in the process can be any one that can be synthesized as polymers within the pores of mesoporous materials by various polymerization categorized as step-growth polymerization and chain-growth polymerization. Representative examples thereof can include any organic monomers that can cause chain-growth polymerization using radicals, cations and anions as initiators, such as ethylene, 1-alkyl olefins, 1,3-dienes, styrene, methyl styrene, halogenated olefins, vinyl ester, acrylates, methacrylates, acrylonitrile, methacrylonitrile, acrylamide, methacrylamide, vinyl ethers, N-vinyl carbazole, N-vinyl pyrrolidone, aldehydes, ketones, etc. Other organic monomers whose polymerization method is known can be acenaphthalene, ethyl vinyl ether, propene, n-butyl vinyl ether, i-butyl vinyl ether, p-methoxystyrene, isobutylene, allyl acetate, vinyl acetate, p-bromostyrene, allyl chloride, isoprene, 2-vinylpyridine, vinyl chloride, m-nitrostyrene, vinylidene chloride, methyl methacrylate, methacrylic acid, methyl acrylate, vinyl fluoride, n-butyl acrylate, acrylic acid, 1-hexene, methyl vinyl ketone, diethyl, maleate, tetrafluoroethylene, o-chlorostyrene, diethyl fumarate, fumaronitrile, maleic anhydride, etc. One or two classes of these organic monomers can be used to synthesize homopolymers or copolymers. Less than 100% by weight of the organic monomers can be used, although particularly not limited, based on the weights of the mesoporous molecular sieves in order that organic polymers can be coated in pores as films while maintaining the structural order of silica molecular sieves or carbon molecular sieves. The organic monomers can be controlled within less than 100% by weight depending on distribution of the micropores present in nanoporous molecular sieves and can be selected in the range depending on desired properties by those skilled in the art.

Generally, crosslinking agents, initiators and suitable amounts of solvents can be required in polymerizing the organic monomers. These components are all known to the art to which the present invention belongs. Di- or poly-alcohols, amines, and vinyl group derivatives, etc. can be used as the crosslinking agents. The crosslinking agents suitable for the present invention can be 1,2-ethanedioldiacrylate, 1,3-propandioldiacrylate, 1,3-butanedioldiacrylate, 1,4-butanedioldiacrylate, 1,5-pentanedioldiacrylate, 1,6-hexanedioldiacrylate, divinyl benzene, ethyleneglycoldiacrylate, propyleneglycoldiacrylate, butyleneglycoldiacrylate, triethyleneglycoldiacrylate, polyethyleneglycoldiacrylate, polypropyleneglycoldiacrylate, polybutyleneglycoldiacrylate, allyl acrylate, 1,2-ethanedioldimethacrylate, 1,3-propandioldimethacrylate, 1,3-butanedioldimethacrylate, 1,4-butanedioldimethacrylate, 1,5-pentanedioldimethacrylate, 1,6-hexanedioldimethacrylate, ethyleneglycoldimethacrylate, propyleneglycoldimethacrylate, butyleneglycoldimethacrylate, triethyleneglycoldimethacrylate, polyethyleneglycoldimethacrylate, polypropyleneglycoldimethacrylate, polybutyleneglycoldimethacrylate, allyl methacrylate and diallyl maleate, etc. Also, the initiators can be azobisisobutyronitrile, benzoyl peroxide, acetyl peroxide, lauryl peroxide, t-butyl peracetate, cumyl peroxide, t-butyl peroxide, t-butyl hydroperoxide, potassium persulfate, etc. The solvents can be those that can dissolve the organic monomers, the crosslinking agents and the initiators simultaneously, and are readily volatile at lower temperatures than those of the organic monomers and the crosslinking agents. The solvents can be methylene chloride, diethyl ether, ether, ethanol, toluene, acetone, etc., but are particularly limited to these. The polymerization can be carried out in the mesoporous molecular sieves at the temperature ranging from room temperature to 300° C. for several hours or a few days.

The nanoporous organic polymer composites synthesized by above method exhibit superior property concerning structural stability described below, and particularly suggest the possibility that functional groups can be introduced into surfaces of the composites while stably maintaining the structures even at strict conditions such as strong acidic or basic solutions or organic solvents, employing stabilities against the solutions or the solvents. Thus, various functional groups such as a sulfone group, a nitro group, a phosphoric group, a carboxyl group, a hydroxyl group, an amine group, etc. can be introduced into the surfaces of the nanoporous organic polymer composites by adding the composites to various acid solutions (e.g., sulfuric acid, nitric acid, phosphoric acid, acetic acid, etc.) or basic solutions (e.g., caustic soda water or ammonia water, etc.) and subjecting to proper processing time and method. Hereinafter, the method of preparing the nanoporous organic polymer composites in which the sulfone groups are introduced into the surfaces, and excellent catalyst property of the nanoporous organic polymers will be described in detail with reference to examples.

The nanoporous organic polymer composites can be applied to catalytic reaction, and exhibit higher catalytic activity compared to conventional porous catalyst materials. The catalytic reaction applicable to the materials can be esterification, acid catalytic reaction represented by alkylation, Knovenagel reaction, aldol condensation reaction, base catalytic reaction represented by isomerization, and redox reaction comprising aerobic oxidation reaction such as benzene-alcohol oxidation reaction, etc.

Example 1 describes a nanoporous organic polymer polymerized using SBA-15 silica molecular sieve as a support and ethyleneglycolmethacrylate (HEMA) as a monomer, and Examples 2 to 4 describe nanoporous organic polymers prepared using CMK-3 carbon molecular sieves as supports and styrenes as monomers.

The properties for the polymer/silica or the polymer/carbon nanoporous materials prepared by the examples can be confirmed by following results.

The result of X-ray diffraction analysis about the product shows that X-ray diffraction intensity of polyethyleneglycol/SBA-15 (PHEMA/SBA-15) was more increased than that of SBA-15. The same results can be also obtained with carbon molecular sieves. That is, polystyrene/CMK-3 (PS-CMK-3) shows increased X-ray diffraction intensity compared to CMK. These results are shown in FIGS. 1 to 3.

Further, from the results of nitrogen adsorption, it can be confirmed that the ratio of micropores present in silica or carbon molecular sieves after polymerization is decreased compared to that of mesopores. Such results are shown in FIG. 4, and will be described in example 2 in more detail.

Further, the X-ray diffraction results observed after compressing the materials with a pressure of $1.5 \times 10^4$ kg/cm$^2$ for 10 minutes show the same diffraction pattern and intensity as before compressing. Such phenomenon supports that the materials show high stability against mechanical strength compared to materials comprised of pure organics frameworks. The results about the structural stability and surface property of the materials are shown in FIGS. 5 and 6, and the experiments employing the surface property will be described in examples 3 and 4 in more detail.

The present invention will be described in greater detail with reference to the following examples. The following examples are for illustrative purposes and are not intended to limit the scope of the invention.

EXAMPLES

Example 1

Preparation of PHEMA/SBA-15

A silica molecular sieve SBA-15 was synthesized according to previously reported method (see *Chem. Mater.* 2000, 12, 1961). 0.217 g of ethyleneglycolmethacrylate (HEMA), 0.083 g of ethyleneglycoldimethacrylate (EDMA), 0.012 g of azobisisobutyronitrile and 1 ml of diethylether solvent were used in order to coat 30 wt % of polymer per 1 g of SBA-15 synthesized by the method. The materials other than silica of the components were mixed, the mixture was impregnated into mesoporous silica pores, and then dried at 35° C. oven for 6 hours. Such procedures are in order to assist diffusion of the organic monomers within the pores by removing the added solvent (diethylether). Then, mixed materials were sealed at argon atmosphere and stood overnight at 100° C. and 150° C., respectively. After completion of the reaction, the materials were picked out, washed with ethanol, and then dried under vacuum to obtain polyethyleneglycolmethacrylate/silica nanoporous organic polymers (PHEMA/SBA-15). FIG. 1 shows the results of X-ray diffraction analysis for the materials.

Example 2

Preparation of PS/CMK-1~3

Carbon molecular sieves used in experiments concerning the present example are CMK-1~3 that are different in detailed properties with reference to the structures according to pore arrangements, total pore volumes, etc. since they are synthesized using each different mesoporous silicas as templates (see FIG. 2). However, the CMK-1~3 are all identical in terms of describing the essential contents of the present invention except for the differences in such properties, and thus the present example will be described in detail concerning only CMK-3 hereinafter.

The CMK-3 carbon molecular sieve that is obtained by filling sucroses within SBA-15 mesoporous silica and subjecting to carbonization followed by removing the SBA-15 template was synthesized according to previously reported method (see *J. Am. Chem. Soc.* 2000, 122, 10712). Specifically, 1.25 g of sucrose was dissolved in 5 g of water, 0.14 g of sulfuric acid was added to dissolve, and then resulting solution was poured into 1 g of SBA-15 while kneading. The resulting product was dried in 100° C. oven for 6 hours, and then further dried at elevated temperature of 160° C. for 6 hours. Then, a sample was picked out and was cooled to room temperature, and then a solution prepared by dissolving 0.8 g of sucrose and 0.09 g of sulfuric acid in 5 g of water was poured on the sample and kneaded well, and then dried at 100° C. and 160° C. for 6 hours, respectively. Then, a sample was picked out and carbonized at nitrogen of 900° C. or vacuum atmosphere, and then the sample was washed with 50% aqueous solution of hydrofluoric acid to remove silica, thereby finally obtaining CMK-3 carbon molecular sieve. Divinylbenzene and styrene monomers used as crosslinking agents were those that were passed through alumina columns to purify.

0.0715 g of divinylbenzene (DVB), 0.2285 g of styrene (ST), 0.0162 g of 2,2'-azobisisobutyronitrile and 1.5 ml of methylene chloride (MC) were used in order to form about 30% by weight of polymer per 1 g of CMK-3. The materials other than CMK-3 of the components were mixed, the mixture was impregnated into CMK-3, and then dried at 60° C. oven for 6 hours. Such procedures are to remove the added solvent (methylene chloride (MC)) in order to assist diffusion of the organic monomers within the pores. Then, mixed materials were sealed at argon atmosphere and stood overnight and for two days at 100° C. and 150° C. oven, respectively. After completion of the reaction, the materials were picked out, washed with chloroform, and then dried under vacuum to obtain crosslinked polystyrene/carbon nanoporous organic polymers (PS/CMK-3).

The X-ray diffraction patterns of CMK-3 and PS/CMK-3 are shown in FIG. 3. Generally, when a guest material is impregnated within mesopores, the intensity of X-ray diffraction peaks is decreased. The position of the guest materials can be decided through such changes of the intensity of X-ray diffraction. However, for PS/CMK-3 in which polystyrene is impregnated in CMK-3, it was shown that the intensity of X-ray diffraction was increased. These results can be interpreted as that the polymerization of styrene within micropores in carbon frameworks fills micropores so that structural defects can be supplemented, and thus structural order is increased. The results show that the density of mesopore walls was outstandingly increased due to decrease of micropores. Such fact can be seen through the results of FIG. 4. That is, though about 45% by weight of polymers were polymerized, the size of mesopores was decreased by at most about 7%. It can be confirmed from the results of pore size analysis using BJH algorithm wherein the mesopore size was decreased from 4.1 nm to 3.8 nm (decrease by about 7%).

Example 3

Preparation of PS/CMK-3 in Which a Sulfone Group is Introduced

A sulfone group (—$HSO_3$) was introduced into surfaces of polystyrene/CMK-3 nanoporous materials by adding 1 g of PS/CMK-3 nanoporous materials synthesized according to the method described in the example 2 to 20 ml of concentrated sulfuric acid (98%), and boiling at 100° C. for 4 hours. Specific surface area of final materials was 650 $m^2$/g, and the distribution of pore size was shown as the same as before introduction of the sulfone group. It can be confirmed that the density of introduced sulfone group was about $4\times10^{-3}$ mol per 1 g of polymer through NaOH titration. The polystyrene/CMK-3 nanoporous materials included about 20 mol % of divinylbenzene as crosslinking agent. For commonly used crosslinked polystyrene resin in which the amount of the divinylbenzene is usually 2 to 8% by weight, ability of $Na^+$ion exchanging is 1.8 to $4.8\times10^{-3}$ $molg^{-1}$. Considering that as the amount of divinylbenzene is increased, the ability of ion exchanging is decreased rapidly, the value of the results is very surprising. Further, the material shows almost the same X-ray diffraction patterns as before introduction of a sulfone group (—$HSO_3$), and it means that ordered nanostructures are conserved even after reaction. From such experiments, it can be seen that polymer/carbon nanoporous organic polymer has heat resistance and chemical resistance, thereby freely introducing functional groups into the material. It can be also seen that many functional groups can be readily introduced due to large surface area of the material.

Example 4

Surface Property of PS/CMK-3 Nanoporous Material

Nanopore walls of PS/CMK-3 nanoporous organic polymer were deformed with a sulfone group as in example 3, the material was packing into columns, and then was adsorbed with Direct Blue-15 organic dye. Further, the dye was adsorbed identically even on the columns in which CMK-3 mesoporous carbon molecular sieve was filled, and a degree in which adsorbed dye is eluted was observed while flowing solvents. A mixture of water and ethanol in proper proportion was used as a solvent, and the concentration of eluted dye solution was analyzed using UV absorption spectrum at 600 nm wavelength.

As can be seen in FIG. 5, polystyrene/carbon nanoporous organic polymer substituted with a sulfone group has different elution concentration depending on the composition of water and ethanol in solvent, whereas for CMK-3, the dye was never eluted irrespective of the composition of solvent. Such phenomenon results from the fact that for CMK-3 having pure carbon surfaces, its affinity to dye is so strong that adsorption can be semi-permanently achieved irrespective of the effect of solvent, whereas for polystyrene/carbon nanoporous organic polymer, the polymer coats the carbon surfaces so completely that such strong affinity can not be present. From such results, it can be found that the nanopore walls are effectively coated with polystyrene polymer films, and it can be suggested that the surface property can be controlled by modulating types and amounts of the functional groups bonded to the polymer.

Example 5

Nanopore walls of PS/SBA-15 nanoporous organic polymer composite were deformed with a sulfone group as in example 3, and catalytic reactivity of esterification of benzoic acid and hexanoic acid was investigated. 0.5 M benzoic acid and hexanoic acid, and toluene solution were used in the reaction, and the initial concentration of reactants was allowed to be 20 times the concentration of sulfonic acid in catalyst material. The reaction was carried out at 75° C., and progress degree of the reaction and selectivity were investigated by gas chromatography. For comparative experiments, a polymer containing sulfonic acid commercially available, Amberlyst®15, and a material that SBA-15 was treated with organosilane to combine sulfonic acid, in addition to PS/SBA-15, were used as catalysts. The comparative results for the catalytic reaction are shown in FIG. 7. As can be seen in FIG. 7, PS/SBA-15 nanoporous organic polymer exhibited higher catalytic activity than that of any other catalysts used in other examples, and 92% of reaction selectivity more increased than 85% of Amberlyst®15. However, SBA-15 in which organosilane having identical structures is combined to exhibited little catalytic activity.

The nanoporuous organic polymer composite according to the present invention is excellent in mechanical strength, thermal stability and chemical resistance. Further, according to the preparation method of the nanoporuous organic polymer composite of the present invention, a nanoporuous organic polymer composite of which nanopore walls have surfaces coated with a polymer and which is orderly arranged within a mesoporous molecular sieve can be prepared. Further, functional groups can be freely introduced into the material, thereby facilitating modification of surfaces of nanopore walls.

Also, a new material having epochal catalytic activity properties in catalyst application compared to the prior art can be provided by modifying the surfaces of the nanoporous silica molecular sieve with various organic materials and applying the modified materials to catalytic reaction.

What is claimed is:

1. A nanoporous organic polymer composite comprising a mesoporous silica or carbon molecular sieve having micropores within mesopore walls in the range of 2 to 50 nm, and an organic polymer impregnated within the micropores of the molecular sieve and coated on the wall surfaces of the molecular sieve.

2. The nanoporous organic polymer composite according to claim 1, wherein the organic polymer is included in a range of 1~100% by weight based on the weight of the mesoporous molecular sieve.

3. The nanoporous organic polymer composite according to claim 1, wherein an organic functional group is introduced into the mesopore walls of the molecular sieve.

4. The nanoporous organic polymer composite according to claim 2, wherein an organic functional group is introduced into the mesopore walls of the molecular sieve.

5. The nanoporous organic polymer composite according to claim 3, wherein the composite is used as a porous catalyst in acid-base catalytic reaction selected from such as esterification, alkylation, Knovenagel reaction, aldol condensation reaction, etc., and redox reaction represented by benzene-alcohol oxidation reaction.

6. The nanoporous organic polymer composite according to claim 4, wherein the composite is used as a porous catalyst in acid-base catalytic reaction selected from such as esterification, alkylation, Knovenagel reaction, aldol condensation reaction, etc., and redox reaction represented by benzene-alcohol oxidation reaction.

7. A method for preparing a nanoporous organic polymer composite comprising
   (A) preparing a mesoporous molecular sieve having micropores within mesopore walls;
   (B) impregnating an organic monomer diluted in solvent into the molecular sieve; and
   (C) polymerizing the molecular sieve impregnated with the organic monomers to form organic polymers within the micropores and on the wall surfaces of the mesoporous molecular sieves.

8. The method for preparing a nanoporous organic polymer composite according to claim 7, wherein the mesoporous molecular sieve is a mesoporous silica molecular sieve or a mesoporous carbon molecular sieve.

9. The method for preparing a nanoporous organic polymer composite according to claim 8, wherein the organic polymer is included in a range of 1~100% by weight based on the weight of the mesoporous molecular sieve.

10. The method for preparing a nanoporous organic polymer composite according to claims 7, wherein the method further comprises introducing an organic functional group into the mesopore walls of the organic polymer prepared in (C).

11. The method for preparing a nanoporous organic polymer composite according to claims 8, wherein the method further comprises introducing an organic functional group into the mesopore walls of the organic polymer prepared in (C).

12. The method for preparing a nanoporous organic polymer composite according to claims 9, wherein the method further comprises introducing an organic functional group into the mesopore walls of the organic polymer prepared in (C).

* * * * *